(12) United States Patent
Mills et al.

(10) Patent No.: US 6,314,433 B1
(45) Date of Patent: Nov. 6, 2001

(54) FRAME-BASED HEROIC DATA RECOVERY

(75) Inventors: Mark E. Mills, Loveland, CO (US); John L. Moore, Solvang, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/096,784

(22) Filed: Jun. 12, 1998

(51) Int. Cl.[7] .................................................. G06F 17/30
(52) U.S. Cl. ............................ 707/202; 714/758; 360/53
(58) Field of Search ............................. 707/202, 10, 102, 707/103, 201, 204, 205, 206; 360/53, 77.04; 369/54, 32; 714/715, 797, 746, 751, 753, 758, 764, 774, 776, 798, 799, 805

(56) References Cited

U.S. PATENT DOCUMENTS

| | | | |
|---|---|---|---|
| 3,668,631 | * | 6/1972 | Griffith et al. ........................ 714/774 |
| 4,516,165 | * | 5/1985 | Cunningham et al. ................. 360/53 |
| 4,704,641 | * | 11/1987 | Stohs ...................................... 360/53 |
| 5,163,162 | * | 11/1992 | Berry et al. ............................. 369/43 |
| 5,189,566 | * | 2/1993 | Christensen et al. ................... 360/53 |
| 5,321,703 | * | 6/1994 | Weng .................................... 714/797 |
| 5,379,162 | * | 1/1995 | Cunningham et al. ................. 360/53 |
| 5,721,816 | * | 2/1998 | Kusbel et al. ........................ 714/715 |
| 5,909,334 | * | 6/1999 | Barr et al. .............................. 360/53 |
| 5,947,007 | * | 10/1999 | Getreuer ................................. 369/32 |

* cited by examiner

Primary Examiner—Sanjiv Shah

(57) ABSTRACT

Frame-based heroic data recovery on data retrieved from mass storage in which identifiable blocks have been detected to be corrupt. Logical sets of blocks are configured into frames. The invention becomes operable when standard data recovery techniques such as Error Correction Code ("ECC"), working on a frame-by-frame basis, are unable to recover all the corrupt data within the frame because there are just too many corrupt data blocks. The invention then sequentially applies a preselected series of heroic techniques, each heroic technique in the series applied concurrently to all blocks in the frame. The invention combines the corrective effects of the individual applications of heroic techniques in the series, until sufficient individual data blocks overall in the frame are recovered to allow standard frame-based recovery techniques such as ECC to complete the job.

5 Claims, 3 Drawing Sheets

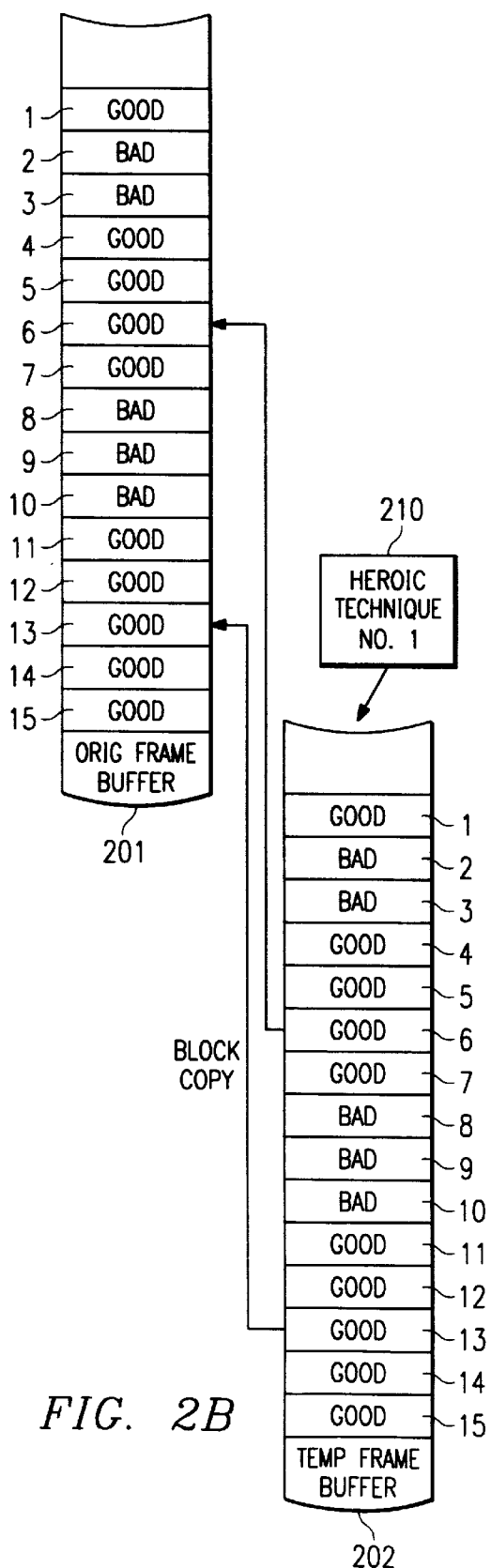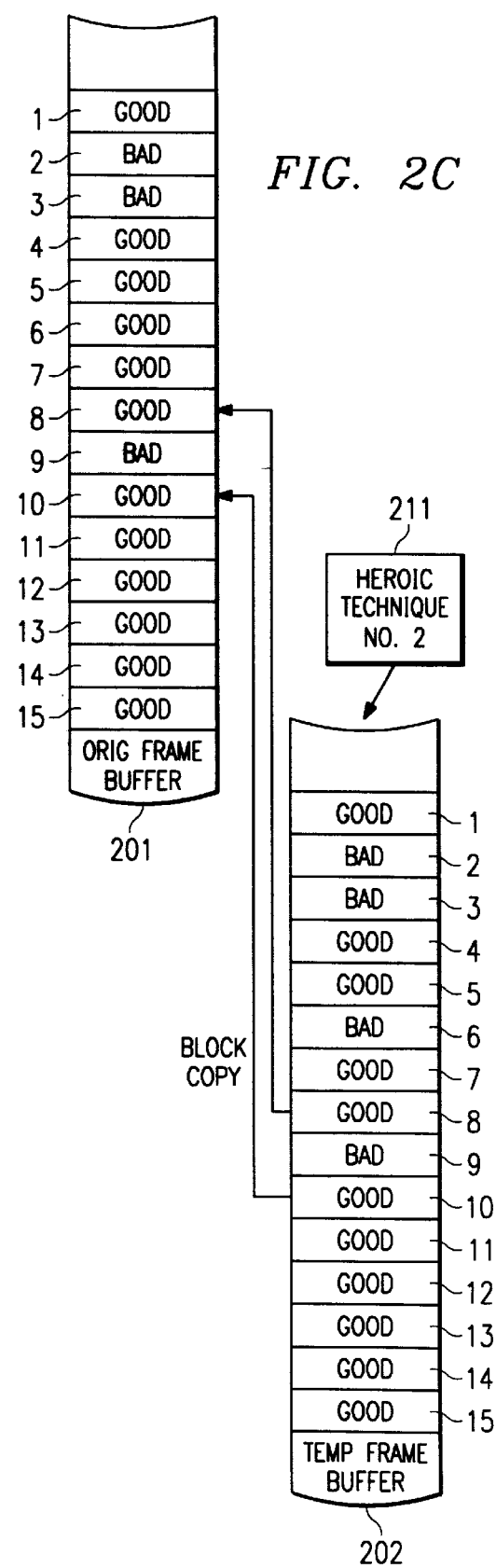
FIG. 2B
FIG. 2C

FRAME-BASED HEROIC DATA RECOVERY

TECHNICAL FIELD OF THE INVENTION

This invention relates generally to heroic techniques in the recovery of corrupt data detected on mass storage devices, and more specifically to accumulating the corrective effects of selected heroic techniques sequentially performed on an entire frame of data in which corrupt blocks have been detected.

BACKGROUND OF THE INVENTION

In the art of mass data storage, it is to be expected that occasionally stored data becomes corrupt on the medium on which it is stored. The read mechanism then becomes unable to retrieve the data from the storage device. Reasons for data becoming corrupt include irregularities in the physical medium on which the data is stored, loss of correspondence between the write mechanism and the read mechanism, or exposure of the data as stored on the medium to adverse environmental conditions. Whatever the reason for the data becoming corrupt, steps must be taken to try to recover the data or else it is lost.

A standard data recovery technique is store the data with a periodic Error Correction Code ("ECC"). The ECC is derived from a predetermined algorithm, in which actual stored data values in the data group to which the ECC pertains are used as the values of variables in the algorithm. The result of the algorithm is the ECC for the data group to which the ECC pertains, and, as noted, the ECC is physically stored on the storage medium in association with the data group. Then, where a portion of the data group is detected to be corrupt, the value of the ECC can be "reversed" back through the algorithm to recover the lost data values to a limited extent.

The extent to which a standard data recovery technique such as ECC can universally recover corrupt data depends on the sophistication of the underlying algorithm and how badly the data is corrupt. The ability of standard data recovery techniques such as ECC to recover data is therefore limited.

"Heroic" data recovery techniques are resorted to in the recovery of stored data when the level of data corruption is too great for standard techniques such as ECC to work. Hence the term "heroic", which for purposes of this disclosure means measures above and beyond standard data recovery techniques such as ECC. Examples of these "heroic" techniques include:

re-positioning of the read sensor from the original/nominal location;

modification of read channel characteristics (read bias, filter boost, etc.); and re-tensioning of the tape (in the case of tape data storage).

Data is generally stored in blocks of a specific, predetermined size. ECC is typically then implemented on a frame basis, a frame being simply a predetermined logical set of data blocks. Error detection and correction during read operations commonly uses a Cyclic Redundancy Check (CRC) at the block level to detect blocks which were incorrectly read from the storage medium. Heroic data recovery operations traditionally are also performed at the block level, so that when CRC detects a corrupt block, heroic operations can be performed on each sequential corrupt block, one block at a time, in the heroic data recovery process.

An inconsistency in traditional data recovery approaches has therefore always been present in that standard techniques such as ECC are done on a frame basis, while heroic data techniques are done on a block basis. Even though only one or two blocks may be detected in error, an entire frame has to be isolated in order to attempt standard data recovery using ECC. If ECC is unsuccessful, and heroic techniques are required, the frame must then be broken back down into blocks to allow heroic recovery on the traditional block-by-block basis. Considerable data processing and physical movement of the read mechanism would be saved if heroic recovery could be done on a frame basis. There is therefore a need in the art to perform heroic data recovery on a frame basis.

SUMMARY OF THE INVENTION

These and other objects, features and technical advantages are achieved by a system and method in which selected heroic data recovery techniques are performed repeatedly on a frame of data blocks in which errors have been detected. The invention becomes operable when standard data recovery techniques such as ECC, working on a frame-by-frame basis, are unable to recover all the corrupt data within the frame because there are just too many corrupt data blocks. The invention then sequentially applies a preselected series of heroic techniques, each heroic technique in the series applied concurrently to all blocks in the frame. Each technique can be expected to recover some, but probably not all of the corrupt blocks. Further, repetition of a particular technique in the series, or each different technique in the series may be expected to recover different corrupt blocks in the frame. The invention combines the corrective effects of the individual applications of heroic techniques in the series, until sufficient individual data blocks overall in the frame are recovered to allow ECC to complete the job.

A preferred embodiment describes the invention with reference to recovering frames of data stored on a tape. The embodiment further describes an exemplary frame size of 64 blocks each storing 1KB of data. ECC is the embodiment's selected standard data recovery technique to be assisted by the inventive application of frame-based heroic data recovery techniques. It will be appreciated, however, that the invention is not limited in these exemplary regards. The invention is independent of any particular storage medium, or any specific standard data recovery technique to be assisted by heroic techniques. The invention is broader in concept in that the advantage may be had by successively applying heroic techniques to a frame of data blocks, the cumulative corrective effect thereof on individual corrupt blocks eventually enabling a frame-based standard data recovery technique such as ECC to take over and completely recover the frame.

It is therefore a technical advantage of the present invention to increase the efficiency with which data is recovered in a combination of standard and heroic techniques. As noted, when the presence of corrupt data is detected at a block level using, for example, checking techniques such as CRC, the first step is to allow standard data recovery techniques such as ECC to attempt to recover the data. The data recovery mechanism therefore goes back and reads in the entire frame in which the corrupt data has been detected. If the data is too corrupt (i.e. there are too many corrupt blocks) for the standard technique to be able to recover the entire frame, then in a traditional approach the data recovery mechanism will then proceed to apply selected heroic data recovery techniques on a block-by-block basis. A block will be read in repeatedly until a heroic technique recovers it. Then the mechanism will move on to the next block.

Under the inventive mechanism, however, once it has been determined at a frame level that standard recovery techniques are insufficient and heroic techniques are needed, a selected series of heroic techniques are applied sequentially, each to an entire frame of blocks at once. Some blocks may be recovered, others may not, but with each successive frame-based application of a heroic technique in which one or more new blocks recovered, the frame becomes increasingly disposed to be recovered by a standard technique such as ECC.

A first improved efficiency of the inventive mechanism over the traditional approach arises out of obviating the need to repeatedly read in individual data blocks to apply heroic techniques until the block is recovered. Instead, entire frames are read in until sufficient blocks are recovered to allow standard techniques such as ECC to recover the frame. The number of starts, stops, reverses and reads required of the data recovery mechanism is thus reduced, saving time required for data recovery as well as wear and tear on the mechanism itself. Further, the full corrective capability of standard techniques is enabled, reducing the amount of heroic data recovery actually needed to restore a frame.

A further technical advantage of the present invention is to reduce the adverse effect of mechanical hysteresis on the data recovery mechanism. In reducing the number of stops, starts, reverses and positional adjustments to the read sensor, the opportunity for mechanical hysteresis to degrade the performance of the mechanism is reduced.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIGS. 2A through 2E depict an exemplary sequence of frame-based operations recovering data in accordance with the invention.

DETAILED DESCRIPTION OF THE INVENTION

Figure 1:
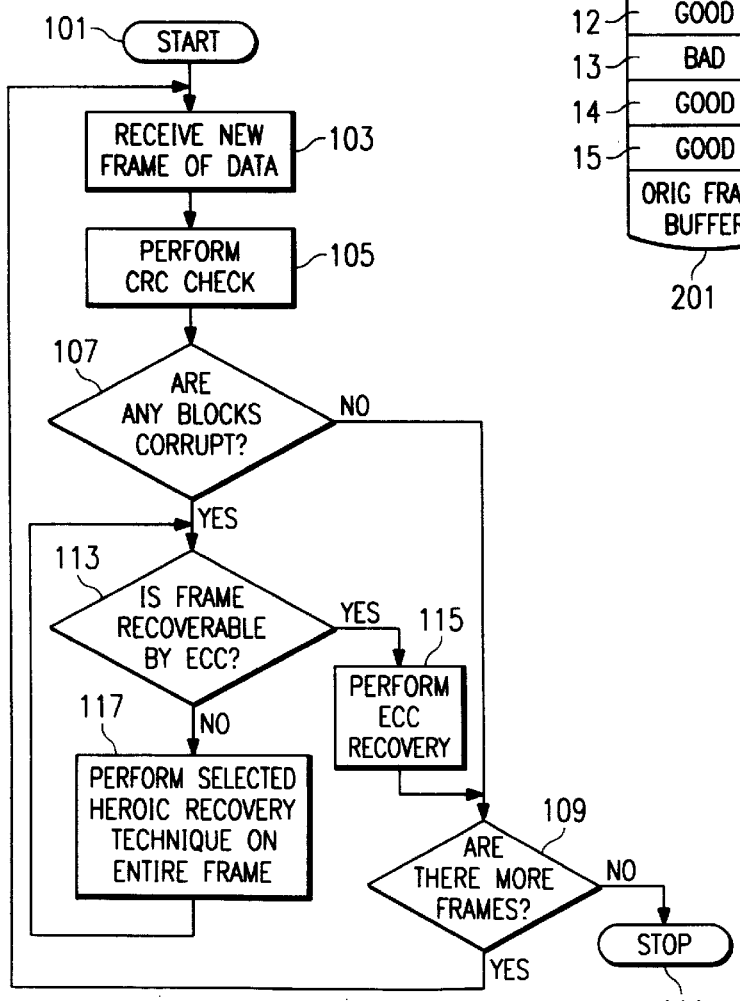
FIG. 1 is a flow diagram illustrating frame-based heroic data recovery according to the present invention.

FIG. 1 is a flow chart describing the inventive frame-based heroic data recovery mechanism at a fairly high functional level. Data is received in frames (blocks 101, 103) and CRC checking is performed at a block level within each frame (block 105) according to mechanisms standard in the art. As a result of CRC checking, corrupt data blocks within a frame can be identified (block 107). If there are no corrupt blocks, then processing may continue to subsequent frames until all frames in the data stream have been processed (blocks 109, 111).

If, however, corrupt blocks are detected (block 107) then data recovery is attempted according to standard frame-based data recovery techniques such as ECC (block 113). It will be appreciated, however, that the power of standard techniques such as ECC to recover data is limited by the extent to which data is corrupted within the frame. In ECC, the more complex the polynomial expression used to recover the data mathematically, the more data blocks that can be recovered. For example in a standard polynomial ECC algorithm, "sixth order ECC" means that the algorithm goes out to six terms and is capable of recovering up to six blocks in error. Therefore, with reference again to blocks 107 and 113 on FIG. 1, if six data blocks or less are detected as being corrupt and if the ECC processing uses "sixth order ECC", then ECC will be able to recover all of the corrupt data in the frame mathematically. If more than six blocks are detected as corrupt, however, then "sixth order ECC" will not be able to recover any of the data.

Selection of the complexity of ECC processing is a design criterion. Clearly, the less complex the polynomial expression that is selected, the less processing overhead that is incurred in routine ECC data recovery operations. On the other hand, selection of a more complex polynomial expression will allow potentially more data to be recovered mathematically.

In block 113 on FIG. 1, if the level of data corruption in the frame is within the power of ECC to recover, then ECC performs that recovery (block 115), and processing continues (blocks 109, 111). If, however, the data is too corrupt for ECC to recover the frame, then heroic techniques are invoked (block 117). As noted above, these techniques may be selected from techniques known in the art such as repositioning the read sensor, modifying read channel characteristics, or altering the tension of a tape (on tape data storage applications). According to the invention, heroic techniques may be selected in any order, and may be repeated multiple times before a different technique is selected.

A key aspect of the invention, however, with further reference to block 117 on FIG. 1, is that the series of heroic techniques is performed on the entire data frame, rather than block-by-block, as is traditional in the art. As each different technique (or each successive repetition of a particular technique) is performed on the data frame, one or more corrupt blocks in the frame may be expected to be recovered. Different blocks may be recovered in different heroic operations. The cumulative corrective effect as heroic techniques continue, however, will be to eventually recover sufficient blocks so as to reduce the number of corrupt blocks in the frame to a number within the purview of the current ECC algorithm. At this point, ECC can take over data recovery and complete the job.

With reference again to FIG. 1, therefore, block 117 indicates the application of a first selected heroic technique to the frame. Block 113 then checks to see if the frame is recoverable by ECC following operation of that first selected technique. If it is, then data recovery via ECC is completed, and processing continues (blocks 115, 109, 111). If it is not, then a second selected heroic technique is performed (block 117 again). As noted, this second operation may either be a repeat of the first technique, or application of a different technique from the first. The process continues until the frame is recovered.

Figure 2A:
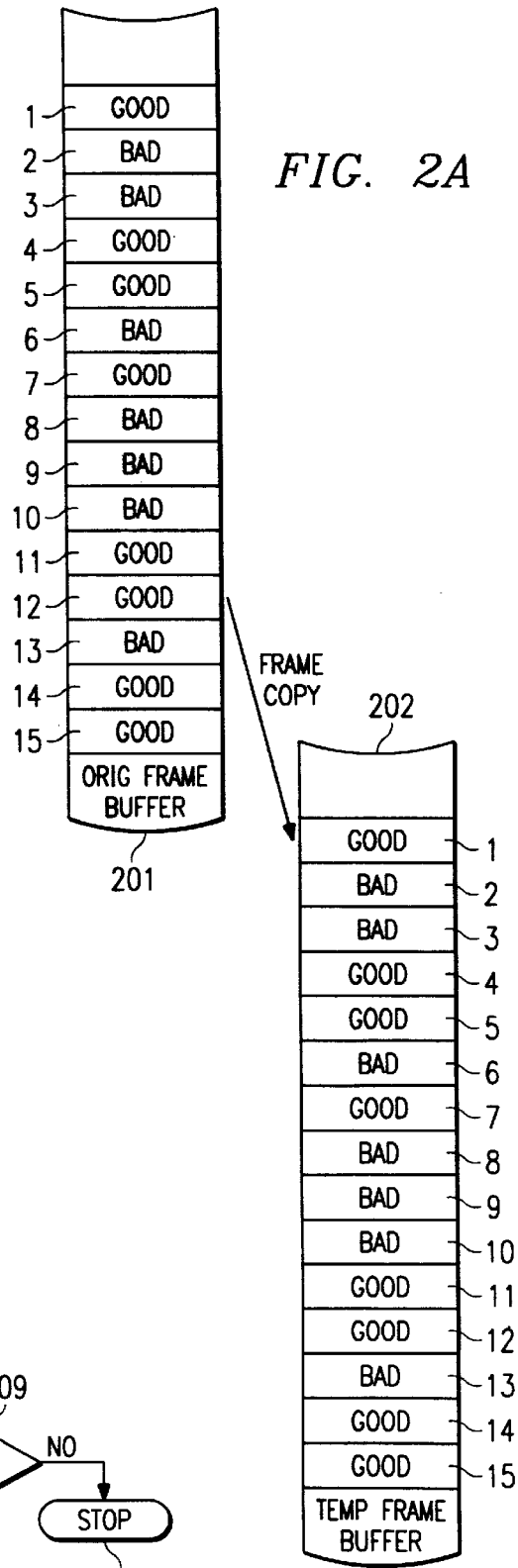

Further explanation of the inventive mechanism is made with reference to the exemplary data recovery operations illustrated on FIGS. 2A through 2E. In FIG. 2A, CRC has determined that seven blocks out of a frame of fifteen are corrupt in original frame buffer 201. These corrupt blocks are shown as $201_2, 201_3, 201_6, 201_8, 201_9, 201_{10}$, and $201_{13}$ on FIG. 2A. It will be appreciated that in actual practice, these numbers (good blocks and corrupt blocks within a frame) would tend to be much larger. For the purposes of illustration, however, a smaller data sample works better.

In the example shown on FIGS. 2A through 2E, it is assumed that second order ECC is used (i.e. the ECC polynomial algorithm can recover up to two corrupt blocks of data in a frame mathematically). Again, in actual practice, the ECC polynomial is likely to be more complex, allowing for a greater level of ECC data recovery. For the purposes of illustration, however, a low order ECC works better.

In FIG. 2A, therefore, there are seven corrupted blocks of data in the frame stored in original frame buffer 201. This exceeds ECC capability. Heroic data recovery techniques in accordance with the invention are required. Accordingly, the original frame buffer 201 is copied into temporary frame buffer 202 to facilitate such heroic techniques.

Turning now to FIG. 2B, a first heroic technique 210 is applied to temporary frame buffer 202. It is successful in recovering the data in blocks $202_6$ and $202_{13}$. These recovered blocks are therefore copied over the corresponding blocks $201_6$ and $201_{13}$ in original frame buffer. This leaves five corrupt data blocks in original frame buffer 201, still beyond ECC recovery capability.

Moving to FIG. 2C, a second heroic data recovery technique 211 is applied to temporary frame buffer 202. As noted, second heroic technique 211 may be different from first heroic technique 210, or may be a repeat thereof. In any event, in the example illustrated on FIG. 2C, second heroic technique 211 is successful in restoring blocks $202_8, 202_{10}, 202_{13}$ in temporary frame buffer 202. Of course, first heroic technique 210 on FIG. 2B was previously able to recover $202_{13}$. However, data blocks $202_8$ and $202_{10}$ are newly-recovered blocks. The recovered data in blocks $202_8$ and $202_{10}$ is therefore copied over the corresponding blocks $201_8$ and $201_{10}$ in original frame buffer 201. This leaves three corrupted data blocks in original frame buffer 201, still beyond ECC recovery capability.

Figure 2D:
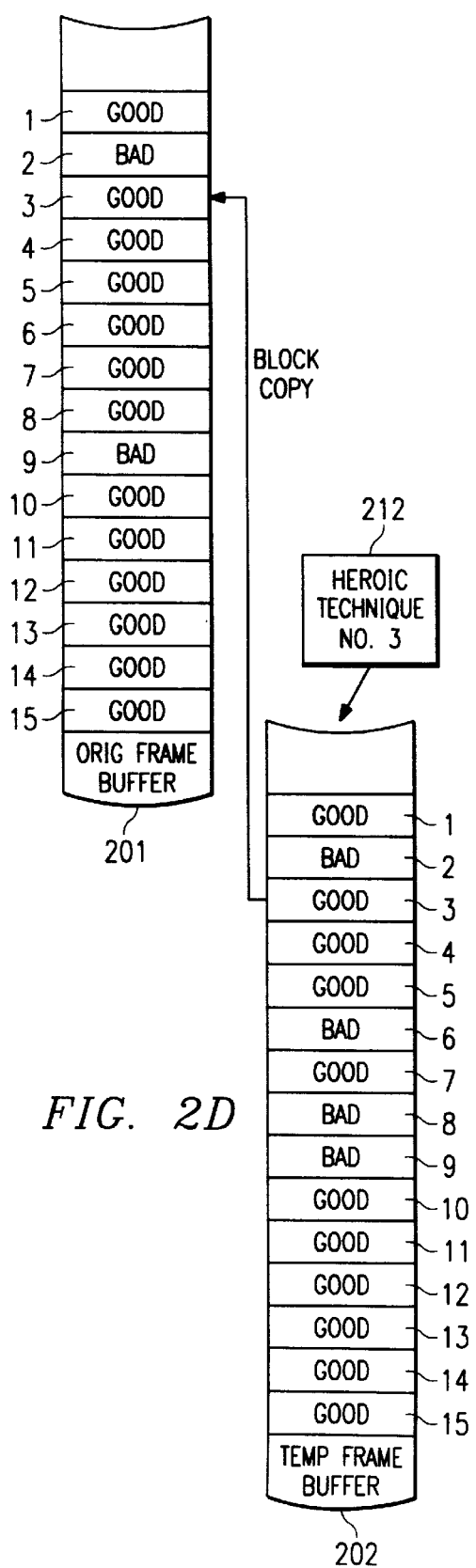

Turning now to FIG. 2D, a third heroic data recovery technique 212 is now performed on temporary frame buffer 202. Third heroic technique 212 may be a repeat of the previous techniques 210 and 211, or an entirely new technique. In the example illustrated, third heroic technique 212 is able to restore the data in blocks $202_3, 202_{10}$ and $202_{13}$. Of course, first heroic technique 210 was able to recover $202_{13}$, and second heroic technique 211 was able to recover $202_{10}$. Block $202_3$, however, is a newly-recovered block. The recovered data in block $202_3$ is therefore copied over the corresponding block $201_3$ in original frame buffer 201.

Figure 2E:
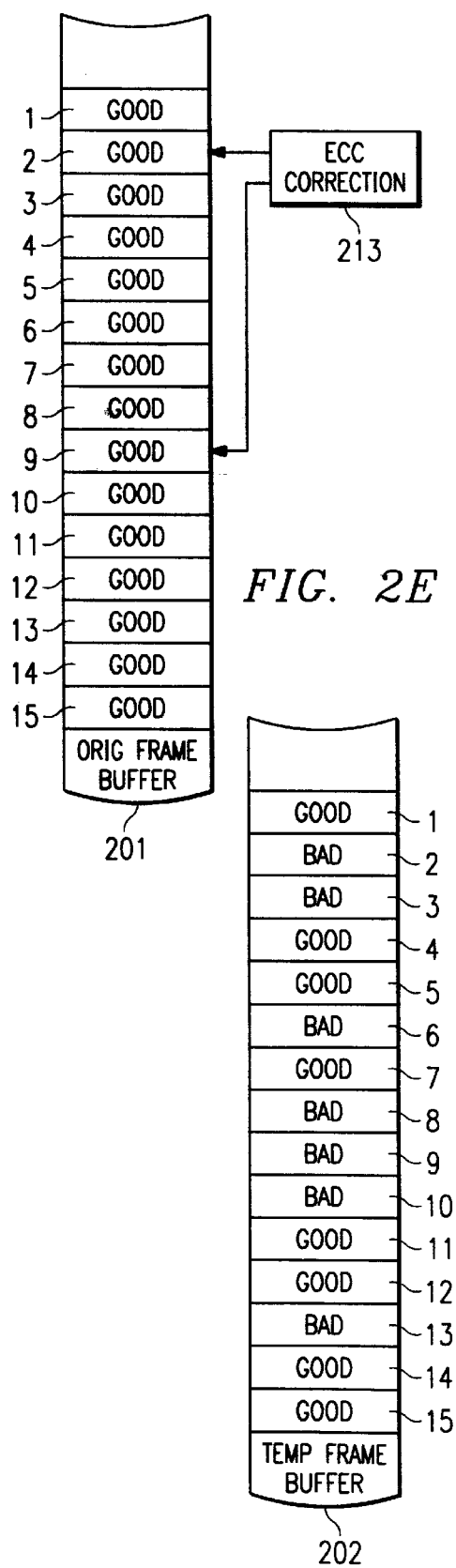

This leaves two corrupted data blocks in original frame buffer 201 (blocks $201_2$ and $201_9$), which with reference to FIG. 2E will be seen to be recovered mathematically by ECC 213, since this level of data corruption (two blocks) is within the capability of second order ECC as used in this example.

It will be appreciated that in the foregoing example, no individual heroic data recovery technique was capable of recovering sufficient blocks by itself to enable ECC to pick up and finish the job. The cumulative frame-based corrective effect of all three exemplary heroic techniques, however, was to be able to recover sufficient data to enable ECC to be effective. Under traditional methodologies, therefore, the three heroic techniques would have had to have been applied sequentially to individual blocks on a block-by-block basis. Processing of the next block would not begin until the previous block was recovered. The inventive mechanism obviates the inefficiencies inherent in such a procedure, as described in great detail in the preceding "summary section". In fact, prototypes using the invention as shown and described in a tape-drive embodiment have demonstrated a five- to ten-fold improvement in data recovery effectiveness and efficiency.

It should be emphasized that the present invention is not limited to a preferred embodiment of tape-stored data in which a frame contains 64 blocks each storing 1KB of data. The inventive frame-based data recovery mechanism applies equally to other storage medium management systems, such as CD ROMS, hard drives or floppy disks, in any predesigned framed/block size configuration.

It will be further appreciated that the inventive data recovery mechanism may also be embodied in software executable on a processor also disposed to write data to and read data from the storage medium on which the inventive mechanism is enabled.

Although the present invention and its advantages have been described in detail, it should be understood that various changes, substitutions and alterations can be made herein without departing from the spirit and scope of the invention as defined by the appended claims.

We claim:

1. A method of recovering data from a storage medium, wherein the storage medium has organized data into blocks and the blocks are coded with an error detection code, wherein the storage medium has further organized data into frames comprising a preselected number of blocks and the frames are coded utilizing an error recovery code, the method comprising the steps of:

(a) reading data from the storage medium associated with a frame;
   (b) detecting blocks containing corrupted data;
   (c) recovering the corrupted data utilizing the error recovery code;
   (d) outputting the data if step (c) is successful;
   (e) if step (c) is unsuccessful, applying a heroic data recovery technique of a plurality of heroic techniques to each block of the frame;
   (f) repeating step (e) utilizing another technique of said series of heroic techniques until the earlier of:
      (i) each technique of said series of heroic techniques has been used; and
      (ii) a minimum number of blocks have been recovered such that the data of the frame may be recovered; and
   (g) outputting an error signal if step (e) is performed unsuccessfully, otherwise outputting the data.

2. The method of claim 1, wherein step (e) includes the sub-steps of:

reading each block of the frame utilizing the heroic data recovery technique; and
   detecting whether corrupted data has been recovered utilizing the error detection code.

3. The method of claim 1 wherein the error detection code utilizes a cyclic redundancy check polynomial.

4. The method of claim 1 wherein the error recovery code utilizes an error correction code (ECC) polynomial.

5. The method of claim 4 wherein the ECC polynomial is an Nth order ECC polynomial and the minimum number of blocks equals the number of detected blocks within the frame minus N.

* * * * *